(12) United States Patent
Pitchford

(10) Patent No.: US 6,398,126 B1
(45) Date of Patent: Jun. 4, 2002

(54) AUXILIARY SOLE INCLUDING SCENT DISPENSING MEANS

(76) Inventor: Steven L. Pitchford, 1522 La Forest La., Concord, NC (US) 28027

( * ) Notice: Subject to any disclaimer, the term of this patent is extended or adjusted under 35 U.S.C. 154(b) by 9 days.

(21) Appl. No.: 09/621,881

(22) Filed: Jul. 22, 2000

(51) Int. Cl.[7] .............................................. A24F 25/00
(52) U.S. Cl. ............................ 239/36; 239/34; 239/54; 239/57; 222/175; 36/7.1 R; 36/7.3; 36/113; 36/136
(58) Field of Search .............................. 239/34, 36, 53, 239/54, 57; 36/7.1 R, 7.3, 3 R, 55, 87, 113, 132, 136; 222/175

(56) References Cited

U.S. PATENT DOCUMENTS

| | | | | |
|---|---|---|---|---|
| 4,186,502 A | * | 2/1980 | Foster | 36/136 |
| 4,682,715 A | * | 7/1987 | Reeves | 239/153 |
| 4,722,477 A | * | 2/1988 | Floyd | 239/36 |
| 4,735,010 A | * | 4/1988 | Grinarml | 239/36 |
| 4,769,931 A | * | 9/1988 | Morrow et al. | 36/134 |
| 5,024,008 A | * | 6/1991 | Maples | 35/136 |
| 5,074,439 A | * | 12/1991 | Wilcox | 239/36 |
| 5,148,949 A | * | 9/1992 | Luca | 36/136 |
| 5,461,814 A | * | 10/1995 | Reid et al. | 239/36 |
| 5,901,490 A | * | 5/1999 | Lush | 43/1 |
| 6,038,804 A | * | 3/2000 | Cuerrier | 43/1 |
| 6,202,324 B1 | * | 3/2001 | Whitlock | 36/7.1 R |

\* cited by examiner

*Primary Examiner*—William Doerrler
*Assistant Examiner*—Dinh Q. Nguyen
(74) *Attorney, Agent, or Firm*—Christopher C. Dremann

(57) ABSTRACT

An auxiliary sole includes a ball portion, a heel portion, scent dispensing means, and attachment means for releasably attaching the heel portion to the ball portion. The ball portion and the heel portion include a base having a plurality of projections depending from the base. The scent dispenser may be made of an absorbent material impregnated with the scent of an animal that is positioned within a recess formed in one of the projections of the ball portion or the heel portion. The base of the ball portion has an elongate opening and the base of the heel portion has a pair of opposed end tabs that are received within the opening of the base of the ball portion. The base of the ball portion and the base of the heel portion may be provided with hook and loop fasteners to releasably attach the heel portion to the base portion.

18 Claims, 2 Drawing Sheets

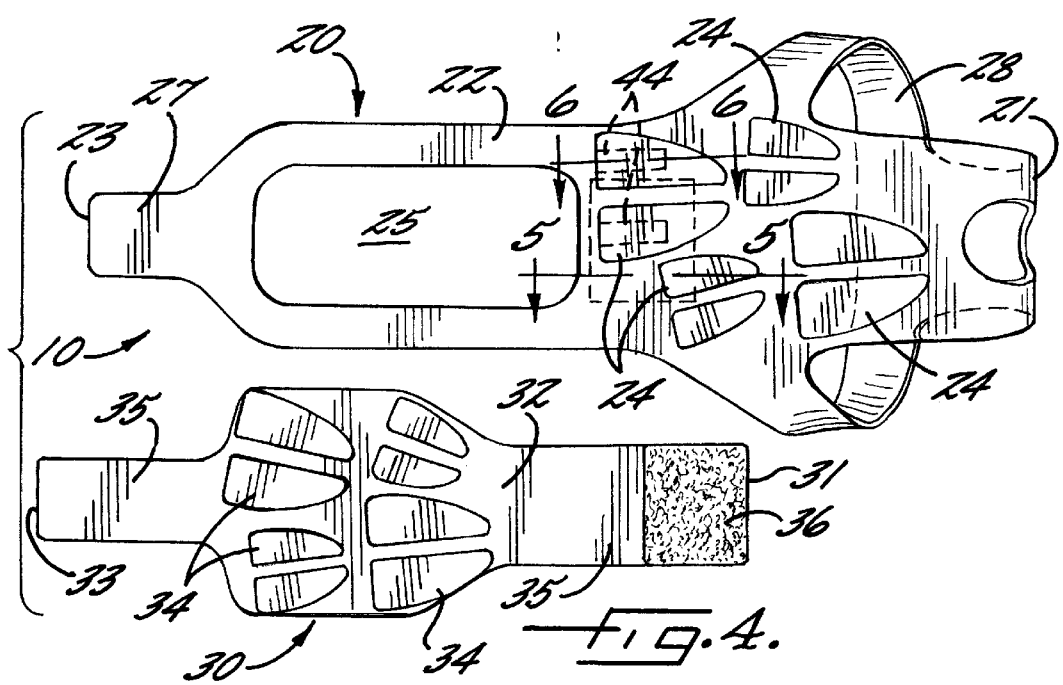
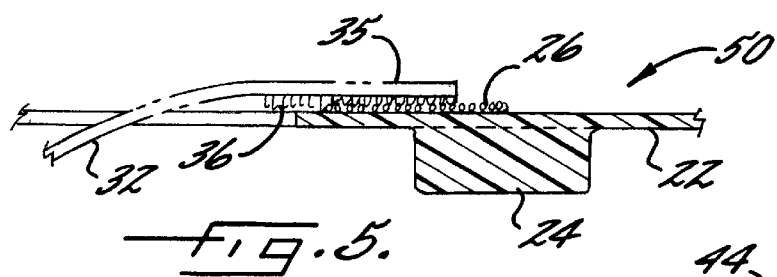
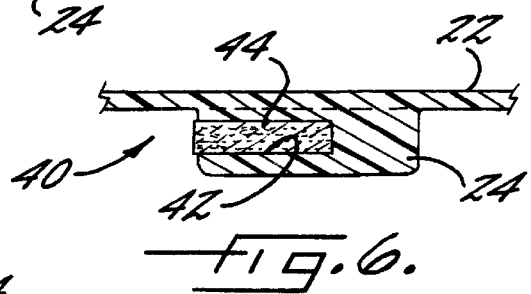
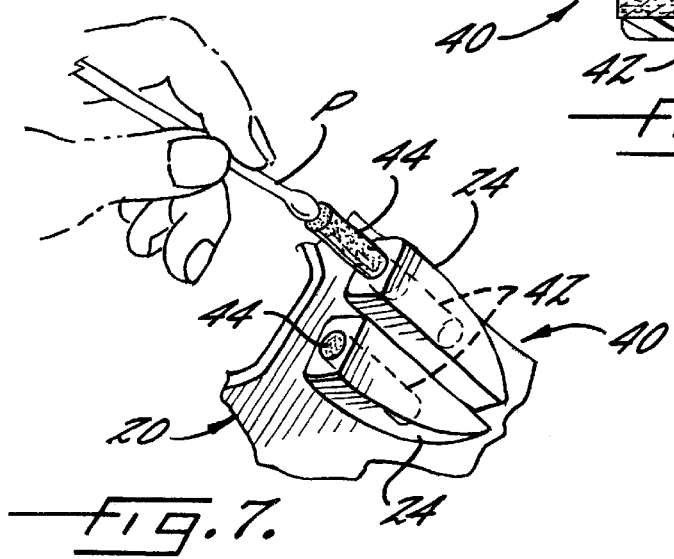

AUXILIARY SOLE INCLUDING SCENT DISPENSING MEANS

CROSS REFERENCE TO RELATED APPLICATION (None)

FIELD OF THE INVENTION

The invention relates generally to a hunting aid. More particularly, the invention is an auxiliary sole for attachment to the footwear of a hunter including means for dispensing an animal scent.

BACKGROUND OF THE INVENTION

Hunters have long used ingenious methods to conceal or disguise themselves from the prey that they are hunting. Such methods have included camouflage clothing, grease paint, hunting blinds, artificial animal tracks, and animals scents. Camouflage clothing and grease paint permit the hunter to blend into the surrounding environment, and thereby avoid being seen by the prey. Similarly, hunting blinds conceal the hunter from the sight of the prey. Artificial animal tracks and animal scents are intended to confuse the prey, or to deceive the prey into believing that an animal of the opposite sex is in the area. The hunter often makes artificial animal tracks, and at the same time avoids leaving footprints or shoeprints, by wearing footwear, or auxiliary soles secured to the footwear, having a plurality of projections that form the tracks of an animal. Animal scents are often sprayed or rubbed onto the hunter's body, clothing and hunting gear to mask the human scent of the hunter.

In many cases, the hunter resorts to two or more of the above methods to increase the likelihood of a successful hunting experience. For example, it is known to spray or rub the projections of the footwear or auxiliary soles with a liquid animal scent to simultaneously produce artificial animal tracks and mask the scent of the hunter. Unfortunately, the liquid animal scent is readily absorbed into the material of the footwear or auxiliary soles. As a result, the effect of the animal scent is diminished, or the animal scent wears off before the hunter has had an opportunity to take advantage of its enticing effect on the prey. Thus, it is apparent a need exists for a hunting aid that disguises the tracks and masks the scent of a hunter, and thereby confuses or deceives the hunter's prey. It is still further apparent a need exists for an auxiliary sole for attachment to the footwear of a hunter that includes means for dispensing an effective and long lasting animal scent.

SUMMARY OF THE INVENTION

Accordingly, it is a principle object of the invention to provide a hunting aid that disguises the tracks and masks the scent of a hunter, and thereby confuses or deceives the hunter's prey. It is a further object of the invention to provide an auxiliary sole for attachment to the footwear of a hunter that includes means for dispensing an effective and long lasting animal scent. The above and other objects are achieved by a hunting aid according to the present invention including an auxiliary sole for attachment to the footwear of the hunter. In the broadest sense, the auxiliary sole includes a ball portion, a heel portion attached to the ball portion and a scent dispensing means.

The ball portion and the heel portion each include a generally planar base having a plurality of projections depending generally perpendicularly from the base. The auxiliary sole further includes means for releasably attaching the heel portion to the ball portion. Preferably, the attachment means includes a plurality of hook fasteners provided on the ball portion and a plurality of corresponding loop fasteners provided on the heel portion. The plurality of loop fasteners cooperate with the plurality of hook fasteners to releasably attach the heel portion of the auxiliary sole to the ball portion of the auxiliary sole. Preferably, the base of the ball portion further has an elongate opening formed therethrough and the base of the heel portion has a pair of opposed end tabs. The pair of opposed end tabs of the base of the heel portion are received within the opening of the base of the ball portion. The base of the ball portion preferably further includes at least one securing strap and an integrally formed toe strap for securing the auxiliary sole to the footwear of the hunter. The at least one securing strap has opposed ends that are affixed to the base of the ball portion so that the securing strap forms an opening for receiving the toe of the hunter's footwear.

Preferably, the base of the ball portion and the base of the heel portion are made of a flexible material, for example natural rubber or a plastic material, such as polyvinylchloride (PVC), polyurethane, silicone or combinations thereof The plurality of projections depending from the base of the ball portion and the plurality of projections depending from the base of the heel portion are formed in the shape of the artificial tracks of an animal. For example, the plurality of projections of the ball portion and the heel portion may be formed in the shape of the hoof prints of a deer. At least one recess is formed in at least one of the plurality of projections of the ball portion, the plurality of projections of the heel portion, or both. The scent dispensing means is positioned within the at least one recess formed in the plurality of projections of the ball portion, the plurality of projections of the heel portion, or both. The scent dispensing means includes an absorbent material, such as cotton, wool, paper, cellulose, synthetic fibers, or combinations thereof, that is impregnated with the scent of an animal. For example, the absorbent material may be impregnated with the scent of a deer.

BRIEF DESCRIPTION OF THE DRAWINGS

The aforementioned and other objects of the invention will become more readily apparent when considered in conjunction with the following detailed description and the accompanying drawings in which:

FIG. 4 is a bottom plan view of the ball portion and the heel portion of the auxiliary sole of FIG. 2;

FIG. 5 is a sectional view of the ball portion and the heel portion of the auxiliary sole of FIG. 4 taken along the line 5—5;

FIG. 6 is a sectional view of the ball portion of the auxiliary sole of FIG. 4 taken along the line 6–6; and FIG. 7 is a perspective view of a portion of the underside of the ball portion of the auxiliary sole of FIG. 4 illustrating the scent dispensing means.

DETAILED DESCRIPTION OF THE PREFERRED EMBODIMENTS

Figure 1:
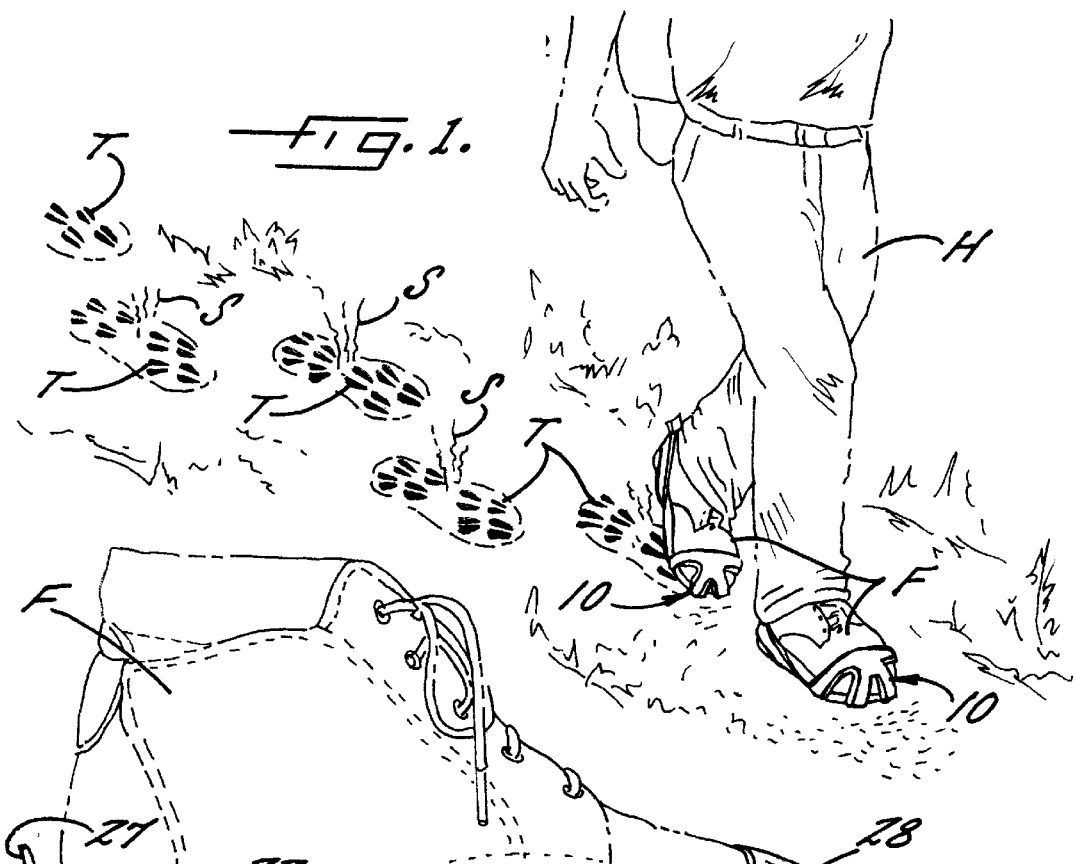
FIG. 1 is an environmental view illustrating a hunter wearing a pair of auxiliary soles according to the invention to simultaneously produce artificial animal tracks and dispense an animal scent.
Figure 2:
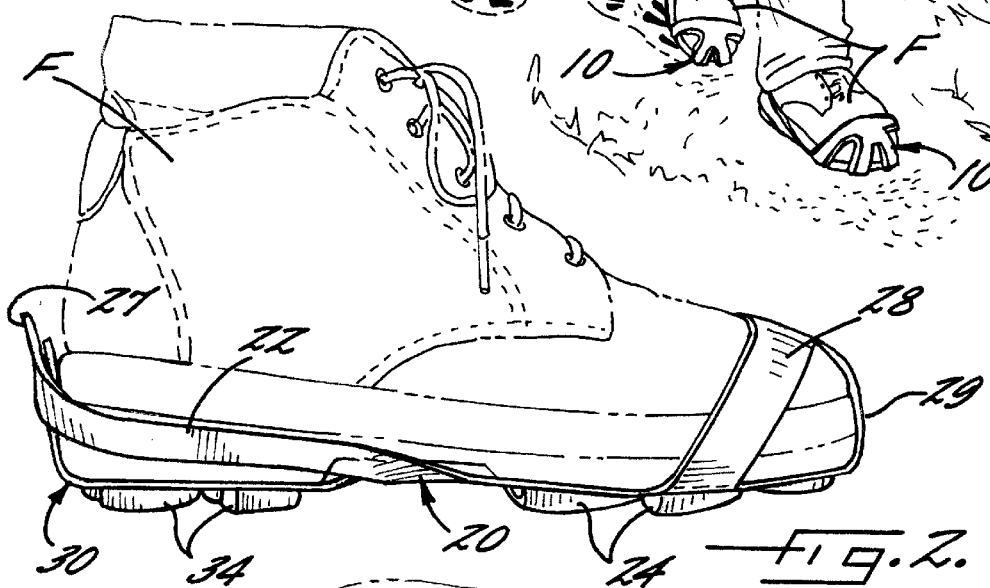
FIG. 2 is a side elevation view of the footwear of the hunter of FIG. 1 fitted with an auxiliary sole according to the invention.
Figure 3:
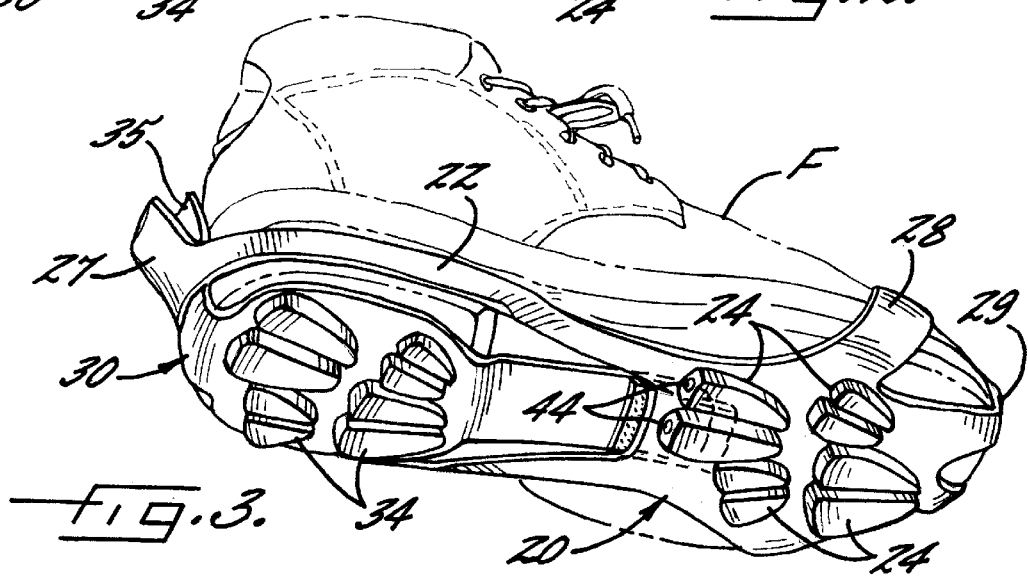
FIG. 3 is a perspective view of the underside of the footwear and auxiliary sole of FIG. 1 showing the plurality of projections that form the artificial animal tracks.

Referring now to the accompanying figures wherein like reference numerals represent like parts in the various views, FIG. 1 illustrates a hunter H, indicated by the phantom lines, utilizing a hunting aid according to the invention. The hunting aid comprises a pair of auxiliary soles 10 secured to the footwear F, indicated by the phantom lines in FIGS. 2 and 3, of the hunter H. The auxiliary soles 10 simultaneously produce artificial animal tracks T and dispense an animal scent S. The artificial animal tracks T and the animal scent S disguise the natural tracks and the scent of the hunter H, and thereby confuse or deceive the hunter's prey. As will be described in greater detail hereinafter, each of the auxiliary soles 10 include a ball portion 20, a heel portion 30 and scent dispensing means 40 (FIG. 7) for dispensing an animal scent S that effectively masks the human scent of the hunter H for the entire duration of the hunt.

As best shown in FIG. 4, the ball portion 20 of the auxiliary sole 10 comprises a generally planar base 22. The base 22 has a plurality of projections 24 depending generally perpendicularly (FIGS. 5 and 6) from the underside of the base 22. Preferably, the plurality of projections 24 are positioned adjacent the forward end 21 of the base 22. The plurality of projections 24 may be affixed to the underside of the base 22 in any known manner, but preferably are integrally molded with the base 22. The base 22 is made of a flexible material, and preferably is molded from natural rubber or a plastic material, such as polyvinylchloride (PVC), polyurethane or silicone, or combinations thereof The base 22 further has an elongate opening 25 formed therethrough for a purpose to be described hereafter. The opening 25 is formed rearwardly of the plurality of projections 24 adjacent the rearward end 23 of the base 22.

Similarly, the heel portion 30 of the auxiliary sole 10 comprises a generally planar base 32. The base 32 has a plurality of projections 34 depending generally perpendicularly from the underside of the base 32. Preferably, the plurality of projections 34 are positioned medially between the forward end 31 and the rearward end 33 of the base 32. The plurality of projections 34 may be affixed to the underside of the base 32 in any known manner, but preferably are integrally molded with the base 32. The base 32 is made of a flexible material, and preferably is molded from natural rubber or a plastic material, such as polyvinylchloride (PVC), polyurethane or silicone, or combinations thereof The plurality of projections 24 depending from the base 22 of the ball portion 20 and the plurality of projections 34 depending from the base 32 of the heel portion 30 are formed in the shape of the artificial tracks T (FIG. 1) of an animal. Preferably, the plurality of projections 24 depending from the base 22 of the ball portion 20 and the plurality of projections 34 depending from the base 32 of the heel portion 30 are formed in the shape of the hoof prints of a deer. The base 32 further has a pair of opposed end tabs 35, one positioned adjacent the forward end 31 of the base 32 and the other positioned adjacent the rearward end 33 of the base 32. The opposed end tabs 35 are received within the opening 25 formed through the base 22 of the ball portion 30 to releasably attach the heel portion 30 to the ball portion 20, as will be described.

As best shown in FIG. 5, the hunting aid further comprises attachment means 50 for releasably attaching the heel portion 30 of the auxiliary sole 10 to the ball portion 20 of the auxiliary sole 10. The attachment means 50 comprises a plurality of hook fasteners provided on one of the ball portion 20 and the heel portion 30 and a plurality of corresponding loop fasteners provided on the other of the ball portion 20 and the heel portion 30. As shown, the attachment means 50 comprises a plurality of hook fasteners 26 provided on the upper side of the ball portion 20 adjacent the forward end of the opening 25 of the base 22 and a plurality of corresponding loop fasteners 36 provided on the opposed end tab 35 on the underside of the heel portion 30 adjacent the forward end 31 of the base 32. The plurality of loop fasteners 36 cooperate with the plurality of hook fasteners 26 to releasably attach the heel portion 30 of the auxiliary sole 10 to the ball portion 20 of the auxiliary sole 10 in a known manner. The plurality of hook fasteners 26 and the plurality of loop fasteners 36 are oversized to provide a predetermined amount of overlap therebetween, thereby permitting the auxiliary sole 10 to be adjusted in length for use with footwear F of various sizes. The ball portion 20 may further comprise an end tab 27 (FIG. 4) for assisting the hunter E to secure the auxiliary sole 10 to the footwear F. Preferably, the ball portion 20 further comprises a securing strap 28 having opposed ends affixed to the base 22 and a toe strap 29 (FIG. 2, FIG. 3) integrally formed with the securing strap 28 and the base 22 of the ball portion 20. The securing strap 28 and the toe strap 29 receive the toe of the hunter's footwear F therein and the opening 25 receives the heel of the hunter's footwear F therein to secure the auxiliary sole 10 to the footwear F.

As best shown in FIG. 6, the scent dispensing means 40 of the auxiliary sole 10 is positioned within at least one recess 42 formed in at least one of the plurality of projections 24, 34 of one of the ball portion 20 and the heel portion 30. As indicated by the dashed lines in FIG. 4, a pair of recesses 42 are formed in a pair of the plurality of projections 24 on the underside of the base 22 of the ball portion 20. However, any convenient number of recesses 42 may be formed in the plurality of projections 24 of the ball portion 20, the plurality of projections 34 of the heel portion 30, or the plurality of projections 24, 34 of both the ball portion 20 and the heel portion 30. Regardless, the scent dispensing means 40 comprises a scent filter 44 made of an absorbent material, such as cotton, wool, paper, cellulose, synthetic fibers, or combinations thereof, that is impregnated with a liquid animal scent S (FIG. 1). Preferably, the liquid animal scent S is applied to the scent filter 44 and the scent filter 44 is inserted into each of the recesses 42 using a cotton swab plunger P, as illustrated in FIG. 7. As shown in FIG. 7, the scent filter 44 of the scent dispensing means 40 is inserted within a pair of recesses 42 formed in the plurality of projections 24 of the base 22 of the ball portion 20. The scent filter 44 comprises an absorbent cotton blend material impregnated with, for example, the scent of a deer. Thus, for the duration of the hunt, the footwear F of the hunter H will simultaneously produce artificial deer tracks (i.e., hoof prints) T and dispense the scent S of a deer.

As should now be apparent, the invention provides a hunting aid that disguises the footprints or shoeprints and the scent of a hunter, and thereby confuses or deceives the hunter's prey. The invention further provides an auxiliary sole for attachment to the footwear of a hunter that includes means for dispensing an effective and long lasting animal scent. Naturally, many alternative embodiments of the invention will be readily apparent to one of ordinary skill in the art as a result of the illustrative example provided herein. As such, the invention is intended to encompass any and all such alternative embodiments that fall within the broadest possible scope of the invention imparted by the above description, the accompanying drawings and the appended claims.

That which is claimed is:

1. A hunting aid for disguising the tracks and the scent of a hunter, the hunting aid comprising:
an auxiliary sole for attachment to the footwear of the hunter, the auxiliary sole comprising
a ball portion comprising a generally planar base having a plurality of projections depending generally perpendicularly therefrom;
a heel portion attached to the ball portion, the heel portion comprising a generally planar base having a plurality of projections depending generally perpendicularly therefrom;
scent dispensing means positioned within at least one recess formed in at least one of the plurality of projections of one of the ball portion and the heel portion; and
attachment means for really attaching the heel portion to the ball portion.

2. A hunting aid according to claim 1 wherein the scent dispensing means comprises a scent filter made of an absorbent material impregnated with the scent of an animal.

3. A hunting aid according to claim 2 wherein the absorbent material of the scent filter is selected from the group consisting of cotton, wool, paper, cellulose, synthetic fibers, and combinations thereof.

4. A hunting aid according to claim 1 wherein the attachment means comprise a plurality of hook fasteners provided on one of the ball portion and the heel portion and a plurality of corresponding loop fasteners provided on the other of the ball portion and the heel portion.

5. A hunting aid according to claim 1 wherein the base of the ball portion further has an elongate opening formed therethrough and the base of the heel portion has a pair of opposed end tabs, each of the opposed end tabs of the base of the heel portion received within the opening of the base of the ball portion.

6. A hunting aid according to claim 1 wherein the base of the ball portion comprises at least one securing strap for securing the auxiliary sole to the footwear of the hunter, the at least one securing strap having opposed ends affixed to the base of the ball portion.

7. A hunting aid according to claim 1 wherein the base of the ball portion and the base of the heel portion are made of a flexible material selected from the group consisting of natural rubber, polyvinylchloride (PVC), polyurethane, silicone and combinations thereof.

8. A hunting aid according to claim 1 wherein the plurality of projections depending from the base of the ball portion and the plurality of projections depending from the base of the heel portion are formed in the shape of the tracks of an animal.

9. A hunting aid according to claim 8 wherein the plurality of projections depending from the base of the ball portion and the plurality of projections depending from the base of the heel portion are formed in the shape of the hoof prints of a deer and wherein the scent dispensing means comprises an absorbent material impregnated with the scent of a deer.

10. An auxiliary sole for attachment to the footwear of a hunter, the
auxiliary sole comprising: a ball portion comprising a generally planar base having a plurality of projections depending generally perpendicularly therefrom;
a heel portion attached to the ball portion, the heel portion comprising a generally planar base having a plurality of projections depending generally perpendicularly therefrom;
scent dispensing means positioned within at least one recess formed in one of the plurality of projections of the ball portion and the plurality of projections of the heel portion; and
attachment means releasably attaching the heel portion to the ball portion.

11. A hunting aid according to claim 10 wherein the scent dispensing means comprises a scent filter made of an absorbent material impregnated with the scent of an animal.

12. A hunting aid according to claim 11 wherein the absorbent material of the scent filter is selected from the group consisting of cotton, wool, paper, cellulose, synthetic fibers, and combinations thereof.

13. A hunting aid according to claim 10 wherein attachment means comprises a plurality of hook fasteners provided on one of the ball portion and the heel portion and a plurality of corresponding loop fasteners provided on the other of the ball portion and the heel portion.

14. A hunting aid according to claim 10 wherein the base of the ball portion further has an elongate opening formed therethrough and the base of the heel portion has a pair of opposed end tabs, each of the opposed end tabs of the base of the heel portion received within the opening of the base of the ball portion.

15. A hunting aid according to claim 10 wherein the base of the ball portion comprises at least one securing strap for securing the auxiliary sole to the footwear of the hunter, the at least one securing strap having opposed ends affixed to the base of the ball portion.

16. A hunting aid according to claim 10 wherein the base of the ball portion and the base of the heel portion are made of a flexible material selected from the group consisting of natural rubber, polyvinylchloride (PVC), polyurethane, silicone and combinations thereof.

17. A hunting aid according to claim 10 wherein the plurality of projections depending from the base of the ball portion and the plurality of projections depending from the base of the heel portion are formed in the shape of the tracks of an animal.

18. A hunting aid according to claim 17 wherein the plurality of projections depending from the base of the ball portion and the plurality of projections depending from the base of the heel portion are formed in the shape of the hoof prints of a deer and wherein the scent dispensing means comprises an absorbent material impregnated with the scent of a deer.

* * * * *